United States Patent
Shitahaku

(10) Patent No.: US 7,302,688 B2
(45) Date of Patent: Nov. 27, 2007

(54) PORTABLE DATA-PROCESSING TERMINAL INCLUDING A PROGRAM COMPETITION MANAGER

(75) Inventor: Jun Shitahaku, Tokyo (JP)

(73) Assignee: NEC Corporation, Tokyo (JP)

( * ) Notice: Subject to any disclaimer, the term of this patent is extended or adjusted under 35 U.S.C. 154(b) by 599 days.

(21) Appl. No.: 10/314,947

(22) Filed: Dec. 10, 2002

(65) Prior Publication Data

US 2003/0110202 A1    Jun. 12, 2003

(30) Foreign Application Priority Data

Dec. 11, 2001    (JP)    ............... 2001-376939

(51) Int. Cl.
    *G06F 9/46*    (2006.01)
(52) U.S. Cl. ...................... 718/105; 718/102
(58) Field of Classification Search ............... 718/100, 718/106, 105, 102
    See application file for complete search history.

(56) References Cited

U.S. PATENT DOCUMENTS

| | | | | |
|---|---|---|---|---|
| 5,867,705 A | * | 2/1999 | Mano | 718/105 |
| 6,148,324 A | * | 11/2000 | Ransom et al. | 718/105 |
| 6,910,210 B1 | * | 6/2005 | Chew | 718/103 |
| 2001/0034753 A1 | | 10/2001 | Hildebrand et al. | |
| 2004/0172631 A1 | * | 9/2004 | Howard | 718/100 |

FOREIGN PATENT DOCUMENTS

| | | |
|---|---|---|
| CN | 1210306 A | 3/1999 |
| EP | 0 817 041 A2 | 1/1998 |
| EP | 0 964 332 A1 | 12/1999 |
| JP | 7-288870 | 10/1995 |
| JP | 11-134203 | 5/1999 |
| JP | 2000-13872 | 1/2000 |
| JP | 2000-92191 | 3/2000 |
| JP | 2000-293386 | 10/2000 |

OTHER PUBLICATIONS

"Mobile Information Device Profile (JSR-37), Java 2 Platform, Micro Edition, 1.0a", Mobile Information Device Profile Specification, XX, XX. Dec. 15, 2000, pp. 1-284, XP002369024 * p. 17-p. 30.

European Search Report dated Jul. 12, 2006.

* cited by examiner

*Primary Examiner*—Meng-Al T. An
*Assistant Examiner*—Camquy Truong
(74) *Attorney, Agent, or Firm*—McGinn IP Law Group, PLLC

(57) ABSTRACT

A cellular phone has a competition manager for controlling a competition between an inquiry task which inquires whether or not the inquiry task is allowed to start and a competing task having a competition with the inquiry task because these two of the tasks use a common lower-level functional unit. The competition manager is implemented by a competition management program which is independent from other application programs.

24 Claims, 3 Drawing Sheets

PORTABLE DATA-PROCESSING TERMINAL INCLUDING A PROGRAM COMPETITION MANAGER

BACKGROUND OF THE INVENTION (a) Field of the Invention

The present invention relates to a portable data-processing terminal and, more particularly, a portable data-processing terminal, such as cellular phone and portable data assistant, having a function for managing the competition between a plurality of tasks.

(b) Description of the Related Art

Portable data-processing terminals such as a cellular phone are widely used in the daily life of the majority of people. A cellular phone, for example, has a plurality of task programs for controlling a plurality of tasks, such as call originating task for originating a call, call accepting task for accepting a call based on a radio signal transmitted from a base station. The cellular phone has also other programs which are not directly involved with the telephone functions, such as a schedule alarm program or a low-voltage alarm program.

The plurality of tasks controlled by the task programs are categorized in a few types including first type which is started by the input operation of the keyboard by the user, second type which is started by the radio signal transmitted from the base station, third type which is started automatically at a specified time interval etc. These tasks are started at respective timings independent of each other, although these tasks may use a common lower-level functional block or unit, such as a receiving block, transmitting block, display unit, or a speaker.

Thus, a competition between a plurality of tasks sometimes arises in the cellular phone, wherein the plurality of tasks use the common lower-level function. For avoiding such a competition in a conventional technique, each task or task program recognizes the status of the other tasks or task programs using the common lower-level functional unit. Such a competition can be avoided, if a task, which is to use a specific lower-level functional unit, recognizes the status of other tasks and delays the use of the specific lower-level functional unit by forecasting a competition.

In the conventional technique for avoiding the competition, as described above, there is a problem in that each program should have an additional program part for avoiding the competition in addition to the program body used for achieving the own inherent task thereby causing an increased size of the program. In addition, if a new task program is added to the existing task programs, the existing task programs must be revised due to the change of the competition conditions. The work for the revision of the programs increases the costs of the cellular phone.

SUMMARY OF THE INVENTION

In view of the above, it is an object of the present invention to provide a portable data-processing terminal which is capable of avoiding competition among the task programs at a lower cost.

The present invention provides a portable data-processing terminal including a CPU, a plurality of task programs on which the CPU runs for achieving a plurality of tasks, and a competition manager for controlling a competition between two of the tasks, the competition manager supplying instructions to two of the tasks having a competition therebetween before one of the two of the tasks starts for operation.

In accordance with the portable data-processing terminal of the present invention, due to the provision of the competition manager, the plurality of programs need not have a program part for controlling the competition with other task programs, with a smaller program part being included in the task program. In addition, the plurality of task programs need not be revised upon addition of a new task program in the cellular phone or change of the competing conditions with the other task programs.

The above and other objects, features and advantages of the present invention will be more apparent from the following description, referring to the accompanying drawings.

PREFERRED EMBODIMENTS OF THE INVENTION

Figure 1:
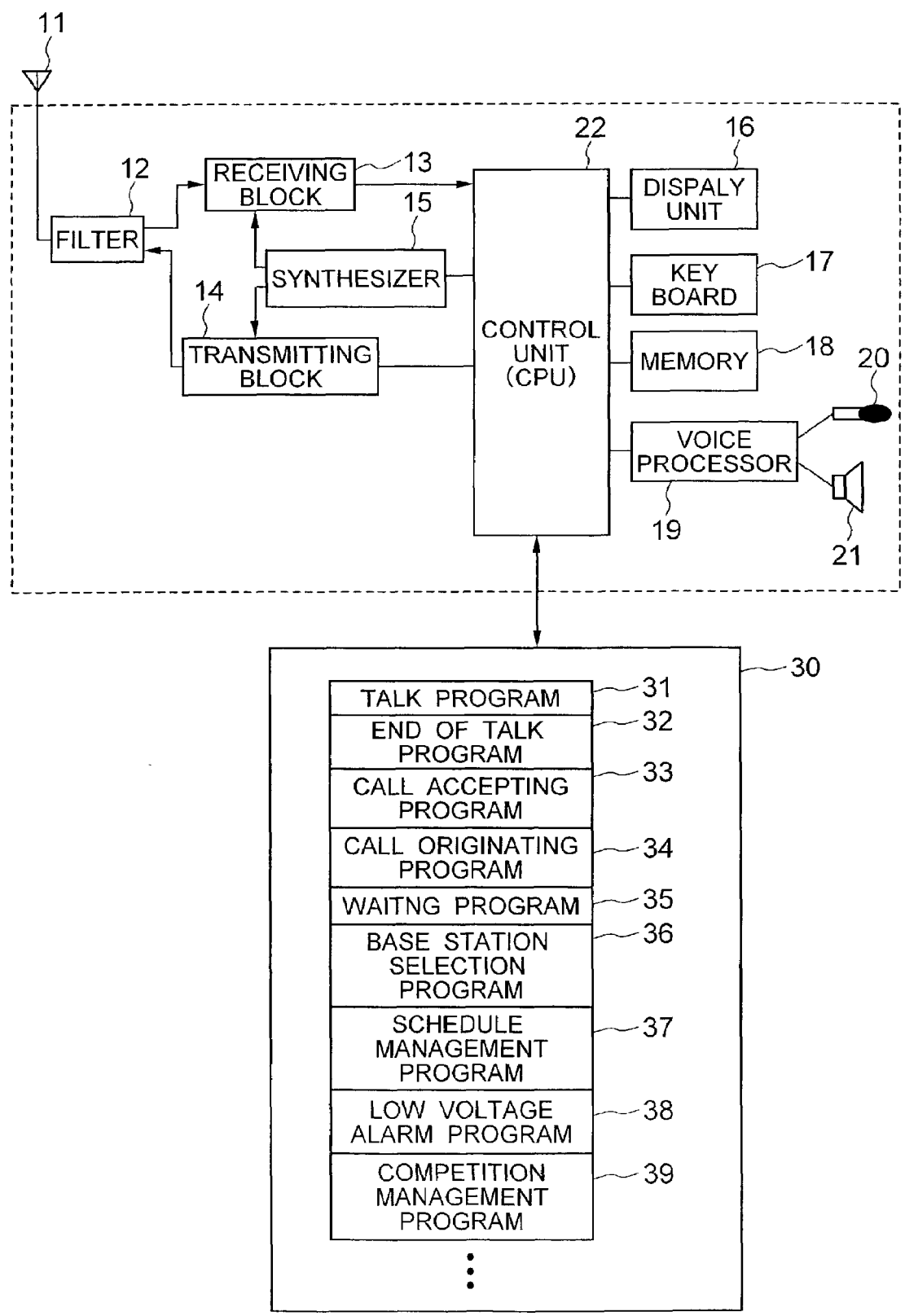
FIG. 1 is a block diagram of a cellular phone, shown as a portable data-processing terminal according to an embodiment of the of the present invention.

Now, the present invention is more specifically described with reference to accompanying drawings. Referring to FIG. 1, a cellular phone, generally designated by numeral 10, is shown as a data processing terminal according to an embodiment of the present invention. The cellular phone 10 includes a receiving/transmitting antenna 11, a filter 12, a receiving block 13, a transmitting block 14, a frequency synthesizer 15, a display unit 16, a keyboard 17, a memory 18, a voice processor 19, a microphone 20, a speaker 21, and a control unit 22 including CPU.

The antenna 11 receives and transmits a radio signal from/to a base station of a radio communication system including the cellular phone 10. The receiving block 12 includes a radio-frequency amplifier, a receiving mixer, intermediate-frequency amplifier and a demodulator, for example, and receives the radio signal from the base station through the antenna 11 and the filter 12 to demodulate the received signal to output a voice signal.

The transmitting block 14 includes a modulator, a transmitting mixer and a power amplifier, for example, and modulates a voice signal, mix the modulated signal with a baseband frequency to transmit the mixed signal through the filter 12 and the antenna 11 to the base station. The frequency synthesizer 15 generates a variable frequency allocated to the cellular phone to output the frequency to the receiving block 12 and the transmitting block 13.

The voice processor 19 receives voice from the microphone 20 to output the voice signal through the control unit 22 to the transmitting block 14, and receives the voice signal from the receiving block 12 through the control unit 22 to output voice through the speaker 21.

The control unit 22 controls the overall operation of the cellular phone 10. Th control unit 22 delivers the voice signal from the receiving block 12 to the voice processor 19, and from the voice processor to the transmitting block 14. The control unit 22 receives the input of a telephone number from the keyboard 17 to display the telephone number on the display unit 16 and deliver the same through the transmitting block 14. The memory 18 temporarily stores the data input from the keyboard and received from the receiving block 12.

The control unit 22 stores therein a program block 30 including a variety of application programs or task programs for achieving a variety of tasks of the cellular phone. The program block 30 includes a talk program 31, an end of talk program 32, a call accepting program 33, a call originating program 34, a waiting program 35, a base station selecting program 36, and a competition management program 39 etc. as well as a schedule management program 37 and a low-voltage alarm program 38. The competition management program 39 constitutes a software competition manager installed in the control unit (CPU) 22, and manages a competition or competitions between two or more of the task programs 31 to 38.

Figure 2:
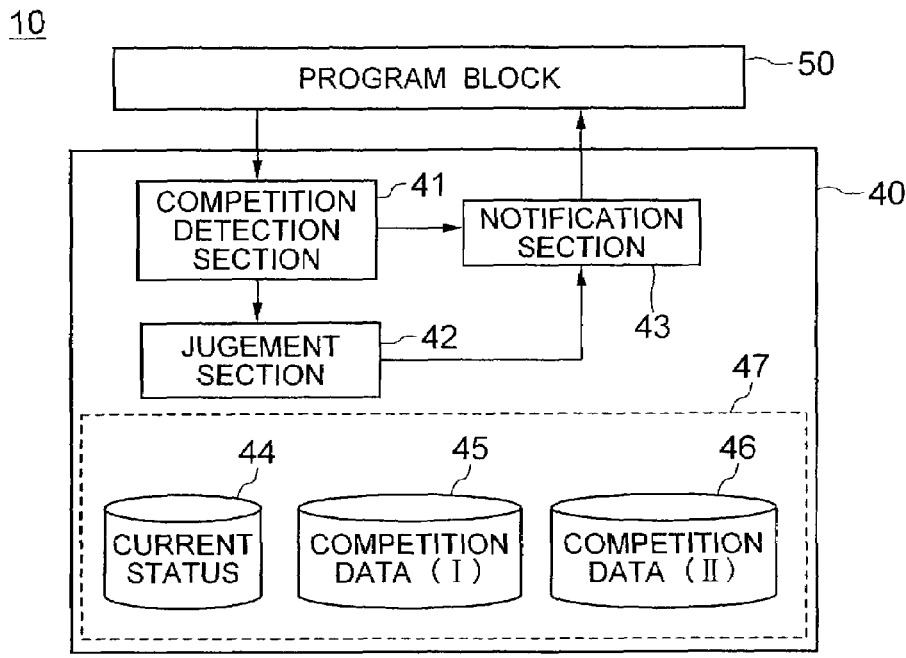
FIG. 2 is a functional block diagram of part of the cellular phone of FIG. 1.

Referring to FIG. 2, there is shown a functional block diagram of a part of the cellular phone of FIG. 1. The cellular phone 10 includes a software competition manager 40 which is constituted by the competition management program 39 shown in FIG. 1, and a task execution block 50 which is constituted by the task programs 31 to 38 in the program block 30 excluding the competition management program 39.

The competition manager 40 includes a competition detection section 41, a judgement section 42, a notification section 43, and a data storage section 47 for storing current status data 44, first competition data 45 and second competition data 46.

The task execution block 50 executes a variety of tasks based on the task programs 31 to 38 which define task execution procedures, such as talk procedure, end of talk procedure, call accepting procedure, call originating procedure, waiting procedure, base station selecting procedure, schedule management procedure, low-voltage alarm procedure in the cellular phone etc.

Those procedures may use common lower-order functional units, such as receiving section 13, transmitting section 14, display unit 16 and voice processor 19, disposed in the cellular phone 10. These task procedures are started by operation of the keyboard 17, a radio call signal supplied from outside the cellular phone, or at a specified time interval, for example, and thus started at a variety of events which may be controlled or not controlled by the operation by the user. Each task in the task execution block 50 delivers an inquiry signal to the competition manager 40 at the start of the own procedure.

The competition manager 40, upon receiving an inquiry signal from a task, judges whether or not a competition arises between the task that delivered the inquiry signal and other tasks that are operating at that instant, thereby detecting the presence of a competition. The competition manager 40 notifies the inquiry task, i.e. the task that delivered the inquiry, of the allowance, hold or prohibition of the start of the task procedure, and notifies the other tasks of respective instructions. The contents of the notification to these members depend on the relationship between these members having a competition therebetween. The instruction from the competition manager 40 avoids the occurrence of the competition.

Example of the detailed operation of the competition manager 40 will be described hereinafter. It is to be noted that the task execution block 50 includes a talk task for processing and continuing a talk, an end of talk task for ending the talk to return to a waiting state, a call accepting task for ringing a call sound upon receiving a call signal from outside, a call originating task for originating a call signal, a schedule management task for managing the daily schedule of the user, and a low-voltage alarm task for detecting and notifying the reduction of the battery voltage. Each of the tasks acts as an inquiry task which delivers an inquiry to the competition manager 40.

In the competition manager 40, when a task delivers an inquiry, the competition detection section 41 compares the current status data 44 against the first competition data 45 to detect whether or not a competition arises after the inquiry task that delivered the inquiry starts for operation. The judgement section 42 determines the instructions for the tasks now operating and the inquiry task after the competition detection section 41 detects a presence of the competition. The notification section 43 notifies the competing tasks of the instructions, which are the results of the judgement by the judgement section 42.

Table 1 shows an example of the current status data 24 stored in the data storage section 47.

TABLE 1

| | Talk | End | Accept | Originate | Schedule | Low-volt. |
|---|---|---|---|---|---|---|
| Status | inactive | Inactive | Active | inactive | held | inactive |

In the table, Talk, End, Accept, Originate, Schedule, and Low-vol. means talk task, end of talk task, call accepting task, call originating task, schedule management task, and low-voltage alarm task, respectively.

The current status data 24 represents the current status of each task, which may be active, inactive, interrupted or held. As the status to be tabulated in the table 1, "active" means that the task is now under operation, "inactive" means that the task is not under operation, "interrupted" means that the task is temporarily interrupted in the active state and ready for restarting the operation, and "held" means that the task is waiting for start of operation after inquiry of allowance for the start. The table 1 exemplarily shows that the call accepting task is now active with the remaining tasks being inactive or held.

Table 2 tabulates instructions to be delivered to the inquiry task shown at the leftmost column in connection with the competing tasks shown at the topmost row when the competing tasks are at states other than "inactive" at the time of the inquiry.

TABLE 2

| Inquiry task | Talk | End | Accept | Originate | Schedule | Low-vol. |
|---|---|---|---|---|---|---|
| Talk | discard | Discard | allow | discard | allow | allow |
| End | allow | Discard | discard | discard | discard | allow |
| Accept | allow | Discard | discard | discard | allow | allow |
| Originate | allow | Discard | discard | discard | discard | allow |
| Schedule | allow | Discard | hold | discard | discard | allow |
| Low-vol. | discard | Discard | discard | discard | allow | discard |

In the table 2, "allow" means that there is no effective competition factor after the start of operation based on the instruction and thus the inquiry task is allowed to start, "discard" means that the start of the inquiry task raises a competition and thus the start signal for the inquiry task is discarded, and "hold" means that the start of the inquiry task raises a competition and is temporarily held for waiting.

In the example shown in the table 2, if the talk task delivers an inquiry, for example, as shown in the second row of the table 2, then it is allowed to start even if the call accepting task, schedule management task and low-voltage alarm task are active, whereas the inquiry itself is discarded if at least one of the talk task, end of talk task and call originating task resides in a state other than inactive.

Table 3 shows an example of the list of the instructions notified by the competition manager 40 to the competing tasks shown at the top row, upon inquiry from each inquiry task shown at the leftmost column, the competing task residing in a state other than inactive.

TABLE 3

| Inquiry task | Competing task | | | | | |
|---|---|---|---|---|---|---|
| | Talk | End | Accept | Originate | Schedule | Low-vol. |
| Talk | continue | Continue | continue | continue | continue | continue |
| End | continue | Continue | continue | continue | continue | continue |
| Accept | start | Continue | continue | continue | continue | continue |
| Originate | continue | Continue | continue | continue | continue | continue |
| Schedule | continue | Interrupt | continue | continue | continue | continue |
| Low-vol. | continue | Continue | continue | continue | end | continue |

In the table 3, the instruction is either start, end, interrupt, restart or continue. The instructions "start", "end", "interrupt", "restart" and "continue" to be notified mean that the competing task which is now held should be started, that the competing task should be ended, that the competing task now active should be interrupted, that the competing task now interrupted should be restarted, and that the competing task now active is allowed to continue without notification thereto.

For example, if the inquiry task is the low-voltage alarm task and the competing task is the schedule alarm task, then the schedule alarm task is ended based on the instruction shown in the table 3 whereas the low-voltage alarm task is allowed to start based on the instruction shown in the table 2.

Figure 3:
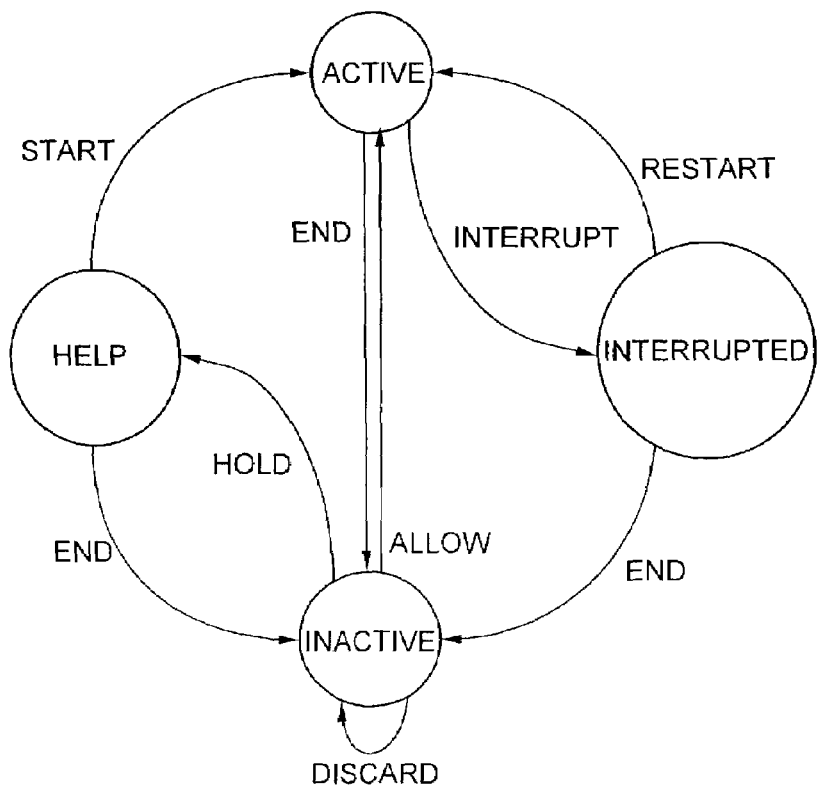
FIG. 3 is a status transition diagram of the cellular phone of FIG. 1.

Referring to FIG. 3, there is shown a transition diagram of the cellular phone of the present embodiment, wherein the status of the task encircled shifts to another status based on the instruction shown by the arrow, the instructions being tabulated in the tables 2 and 3. As shown in FIG. 2, the inquiry task now "inactive" is allowed to start if the instruction by the competition manager 40 is "allow", shifts to "held" if the instruction is "hold", and remains "inactive" if the instruction is "discard".

A task which resides at a state other than "inactive", i.e., "held", "active" or "interrupted" also shifts its status to "inactive", "interrupted" or "active" based on the instruction shown in FIG. 3 by the competition manager 40.

Figure 4:
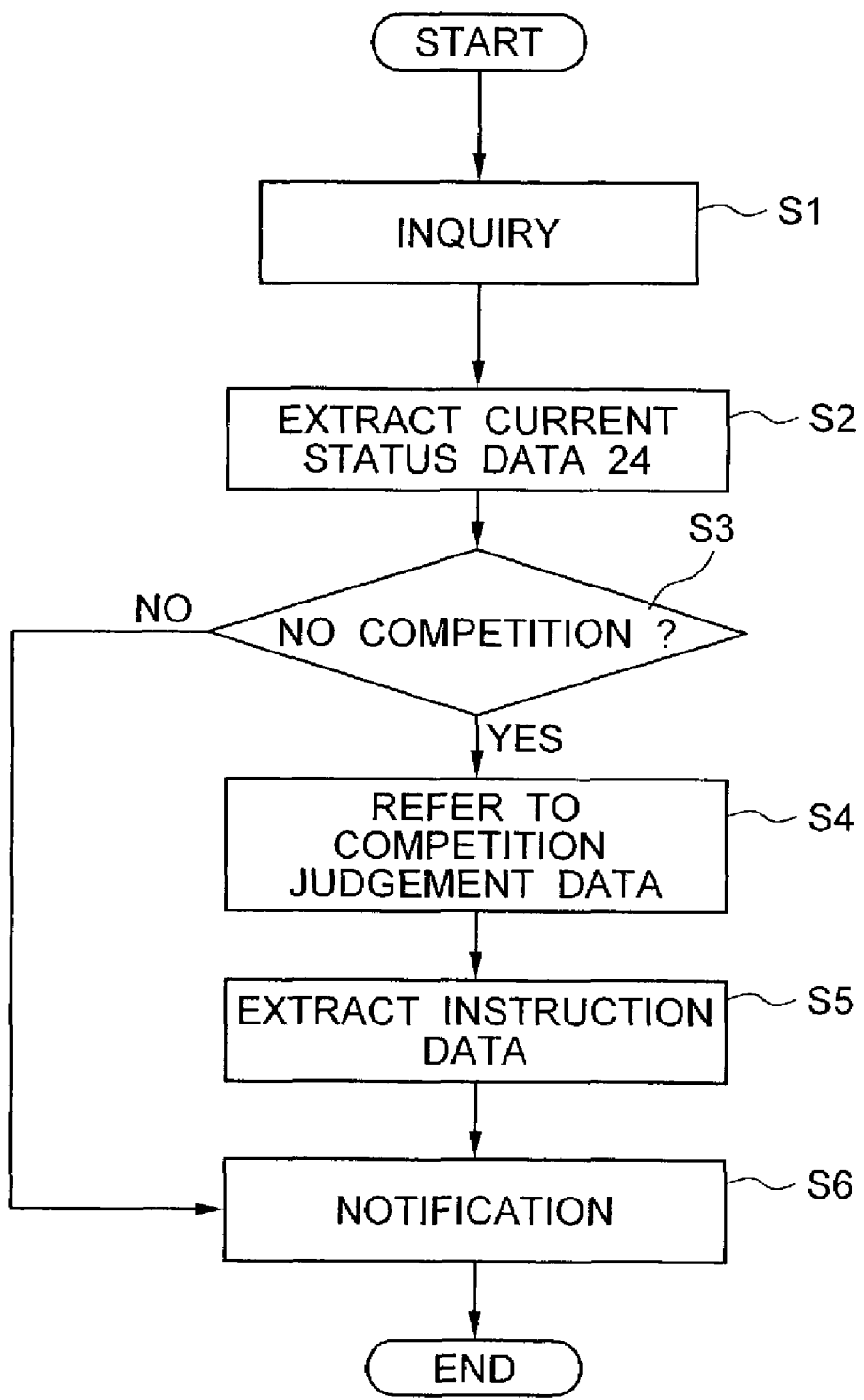
FIG. 4 is a flowchart of the competition manager in the cellular phone of FIG. 1.

Referring to FIG. 4, there is shown a flowchart of the procedure in the cellular phone of the present embodiment. First, an inquiry task delivers, upon receiving a start signal therefor, an inquiry to the competition manager 40 (step S1), the inquiry including the name of the own task and one or more of possible competing task that uses a common lower-order functional unit.

The competition detection section 41 in the competition manager 40 reads the current status data 44 such as shown in the table 1 from the data storage section 47 to extract any task which resides at a state other than "inactive" (step S2). If no task is extracted, which means there is no possible competition, then the process advances to step S7 through step S3.

If at least one task is extracted in step S2, then the extracted task is compared against the possibly competing tasks recited in the inquiry (step S3). If it is judged in step S3 that the extracted task is not the competing task, then the process advances to step S7. On the other hand, if it is judged in step S3 that the extracted task is a competing task, the competition detection section detects occurrence of a competition, and delivers the result of the detection to the judgement section 42. The judgement section 42 reads the first competition data 45 such as shown in table 2 from the data storage section 47 and finds the instruction for the inquiry task, with the extracted task being the competing task (step S4)

If the judgement section 42 detects a plurality of competing tasks on the table 2, and the detected competing tasks provide different instructions for the inquiry task, then the final instruction for the inquiry task is obtained by examining the different instructions in the following order of priority:

discard>hold>allow.

After the final instruction to the inquiry task is obtained, the judgement section 42 starts for obtaining instructions for the competing tasks.

The judgement section 42 then reads the second competition data 46, such as shown in the table 3, from the data storage section 47 and retrieves the instructions for the competing tasks in the table 3 in connection with the inquiry data (step S5). After retrieving the instructions for all of the competing tasks now in a state other than "inactive", the judgement section 42 finishes its operation.

The notification section 43 receives the retrieved instructions from the judgement section 42, and notifies the final instruction to the inquiry task and instructions to the competing tasks (step S6), thereby finishing the procedure of the competition manager 40.

As described above, the competition manager 40 controls the competition between the tasks in the cellular phone of the present embodiment. This configuration alleviates the burden of the application programs in the cellular phone. More specifically, each of the application programs in the cellular phone need not have a program part for avoiding the competition, and it is sufficient that each application program has a small program part for inquiry of the competition.

In addition, since the instructions for the inquiry task and the competing tasks are defined in the tables 2 and 3, the application program may be unchanged upon the change of the competition conditions or addition of a new application program, with only the need of the tables 2 and 3 being changed accordingly.

Moreover, the instructions for the inquiry task and the competing tasks can be easily determined because such instructions can be obtained from the relationship between each two of the tasks.

Since the above embodiments are described only for examples, the present invention is not limited to the above embodiments and various modifications or alterations can be easily made therefrom by those skilled in the art without departing from the scope of the present invention.

For example, the present invention is not limited to the cellular phone as exemplified, and may be applied to any portable data-processing terminal, such as a personal digital assistant. The functional sections 41, 42 and 43 of the competition manager 40 may be implemented by a plurality of program sections of the competition management program on which the CPU runs. In an alternative, at least a part of the competition manager 40 may be implemented by a hardware.

What is claimed is:

1. A portable data-processing terminal comprising:
    a central processing unit (CPU);
    a plurality of task programs stored in said portable data-processing terminal which run on said CPU for achieving a plurality of CPU tasks;
    a competition manager which runs on said CPU for controlling a competition between any two of said plurality of task programs, said competition manager supplying instructions to said two of said plurality of task programs having a competition therebetween before one of said two of said plurality of task programs starts operating; and
    competition definition data that includes a competition judgment table storing said instructions to said inquiry,
    wherein said competition manager receives an inquiry from one of said plurality of task programs and said competition manager determines whether said inquiry task is allowed to start, and judges whether a competition arises between said inquiry task and another of said plurality of task programs, and
    wherein said competition manager further includes a judgement section for determining instructions for said inquiry task and a competing task program, and a notification section for notifying said determined instructions to said inquiry task and said competing task program.

2. The portable data-processing terminal according to claim 1, wherein said competition manager is implemented by a competition manager program which runs on said CPU.

3. The portable data-processing terminal according to claim 1, wherein said competition detection section retrieves current status data having current status information of said plurality of task programs, and said judgment section retrieves instruction data tabulating instructions for each two of said task programs having a possible competition therebetween.

4. The portable data-processing terminal according to claim 3, wherein said current status data includes at least one of active, inactive, held and interrupted states for said task programs.

5. The portable data-processing terminal according to claim 1, wherein said instructions to said inquiry task include at least one of allow, hold and discard said inquiry task.

6. The portable data-processing terminal according to claim 1, wherein said instructions to said competing task programs include at least one of continue, end, interrupt and start operation of said competing task programs.

7. The portable data-processing terminal according to claim 1, wherein an operation of said inquiry task is defined in said competition judgment table.

8. An apparatus for controlling competition between at least two competing operating task programs that run on a central processing unit (CPU) of a portable data-processing terminal, the apparatus comprising:
    receiving means for receiving an inquiry from an inquiry task program stored in said portable data-processing terminal at the beginning of a procedure performed by said inquiry task program on the CPU;
    referencing means for referencing current status data of any task program other than said inquiry task program on the CPU of the portable data-processing terminal in a state other than an inactive state to first competition data;
    detecting means for detecting whether a competition would arise after the inquiry task program would start operating, based on referencing the current status data to the first competition data;
    determining means for determining instructions to transmit to current operating task programs and the inquiry task program, based on detecting whether the competition would arise after the inquiry task program would start operating; and
    notification means for notifying competing current operating task programs of the determined instructions.

9. A method for controlling competition between at least two competing operating task programs that run on a central processing unit (CPU) of a portable data-processing terminal, the method comprising:
    reading current status data from a data storage section;
    extracting current status data from any operating task program which resides in at least one of an active, held or interrupted state;
    comparing the extracted current status data against an inquiry from an operable inquiry task program stored in said portable data-processing terminal;
    judging whether the inquiry from the operable inquiry task program comprises a competing task program with any operating task program associated with the extracted current status data;
    detecting an occurrence of a competition based on judging whether the inquiry from the operable inquiry task program comprises a competing task program;
    delivering a result of the detecting an occurrence of the competition to a judgment section;
    reading first competition data comprising instructions to be delivered to the operable inquiry task program, based on delivering the result of the detecting an occurrence of competition;
    extracting an instruction to be delivered to the operable inquiry task program; and
    delivering the extracted instruction to the operable inquiry task program.

10. The method for controlling a portable data-processing terminal according to claim 9, wherein the detecting said occurrence of a competition further includes:
    detecting a plurality of occurrences of competing operating task programs, based on judging whether the inquiry from the operable inquiry task comprises a competing task program.

11. The method for controlling a portable data-processing terminal according to claim 10, further comprising:
    delivering results of the detecting said plurality of occurrences of the competing operating task programs to a judgment section;

reading first competition data comprising a plurality of instructions to be delivered to the operable inquiry task associated with each competing operating task program, based on delivering the result of the detecting a plurality of occurrences of competing operating task programs; and extracting a plurality of instructions associated with each competing operating task program to be delivered to the operable inquiry task.

12. The method for controlling a portable data-processing terminal according to claim 11, further comprising:

examining differences between each of the extracted plurality of instructions associated with each competing operating task program; and prioritizing each of the extracted plurality of instructions associated with each competing operating task program.

13. The method for controlling a portable data-processing terminal according to claim 12, wherein the prioritizing each of the extracted plurality of instructions further comprises:

prioritizing "discard" instructions before "hold" instructions; and prioritizing "hold" instructions before "allow" instructions.

14. The method for controlling a portable data-processing terminal according to claim 12, further comprising:

delivering the extracted plurality of instructions to the operable inquiry task on the basis of the prioritizing each of the extracted plurality of instructions.

15. The method for controlling a portable data-processing terminal according to claim 11, further comprising:

reading second competition data comprising a plurality of second instructions to be delivered to the competing operating task programs, based on delivering the result of the detecting a plurality of occurrences of competing operating task programs; and extracting a plurality of second instructions associated with and to be delivered to each of the competing operating task programs.

16. The method for controlling a portable data-processing terminal according to claim 15, further comprising:

delivering the extracted plurality of second instructions to the competing operating task programs.

17. The method for controlling a portable data-processing terminal according to claim 15, wherein said second competition data instructions include at least one of continue, end, interrupt and start operation instructions for said competing operating task programs.

18. The method for controlling a portable data-processing terminal according to claim 9, wherein said current status data includes at least one of active, inactive, held and interrupted states for said operating task programs.

19. The method for controlling a portable data-processing terminal according to claim 9, wherein said first competition data instructions include at least one of allow, hold and discard instructions for said operable inquiry task.

20. A portable data-processing terminal comprising:

a central processing unit (CPU);

a plurality of task programs stored in said portable data-processing terminal which run on said CPU for achieving a plurality of CPU tasks;

a competition manager which runs on said CPU for controlling a competition between any two of said plurality of task programs, said competition manager supplying instructions to said two of said plurality of task programs having a competition therebetween before one of said two of said plurality of task programs starts operating; and an operation instruction table storing said instructions for competing tasks when said competition arises between said inquiry task and an other of said plurality of task programs, wherein said competition manager receives an inquiry from one of said plurality of task programs and said competition manager determines whether said inquiry task is allowed to start, and judges whether a competition arises between said inquiry task and another of said plurality of task programs, and wherein said competition manager further includes a judgment section for determining instructions for said inquiry task and a competing task program, and a notification section for notifying said determined instructions to said inquiry task and said competing task program.

21. The portable data-processing terminal according to claim 20, wherein an operation of competing task programs is defined in the operation instruction table.

22. A portable data-processing terminal comprising:

a central processing unit (CPU);

a plurality of task programs stored in said portable data-processing terminal which run on said CPU for achieving a plurality of CPU tasks;

a competition manager which runs on said CPU for controlling a competition between any two of said plurality of task programs, said competition manager supplying instructions to said two of said plurality of task programs having a competition therebetween before one of said two of said plurality of task programs starts operating; and a current status table storing current status data of any task program other than said inquiry task in a state other than an inactive state, wherein said competition manager receives an inquiry from one of said plurality of task programs and said competition manager determines whether said inquiry task is allowed to start, and judges whether a competition arises between said inquiry task and another of said plurality of task programs, and wherein said competition manager further includes a judgment section for determining instructions for said inquiry task and a competing task program, and a notification section for notifying said determined instructions to said inquiry task and said competing task program.

23. The portable data-processing terminal according to claim 22, wherein competition upon the occurrence of an inquiry task is judged based on the current status data of the task programs.

24. The portable data-processing terminal according to claim 22, wherein said current status data includes active, inactive, held and interrupted states of said task programs.

* * * * *